United States Patent [19]
Atkins et al.

[11] Patent Number: 5,013,130
[45] Date of Patent: May 7, 1991

[54] METHOD OF MAKING A CARBON COATED OPTICAL FIBER

[75] Inventors: Robert M. Atkins, Millington; George E. Peterson, Warren; Raymond D. Tuminaro, Livingston, all of N.J.

[73] Assignee: AT&T Bell Laboratories, Murray Hill, N.J.

[21] Appl. No.: 387,261

[22] Filed: Jul. 31, 1989

[51] Int. Cl.⁵ .......................... G02B 6/10; G02B 6/00; C03C 25/02; B05D 5/06
[52] U.S. Cl. .............................. 350/96.3; 350/96.34; 65/3.11; 427/163; 428/364
[58] Field of Search ........................... 350/96.3–96.34; 427/10, 38, 39, 163, 45.1, 46; 65/3.11, 3.43, 3.44, 3.3, 60.2; 428/364, 366, 408

[56] References Cited
U.S. PATENT DOCUMENTS

| | | | |
|---|---|---|---|
| 2,848,696 | 8/1958 | Miller | 333/95 |
| 4,306,897 | 12/1981 | Maklad | 65/3.12 |
| 4,402,993 | 9/1983 | Aisenberg et al. | 427/38 |
| 4,407,561 | 10/1983 | Wysocki | 350/96.3 |
| 4,512,629 | 4/1985 | Hanson et al. | 350/96.3 |
| 4,560,579 | 12/1985 | Siadat et al. | 427/45.1 |
| 4,600,422 | 7/1986 | Scott | 65/3.3 |
| 4,694,586 | 9/1987 | Reznik | 34/1 |
| 4,735,856 | 4/1988 | Schultz et al. | 350/96.3 X |
| 4,772,302 | 9/1988 | Abe | 65/3.12 |
| 4,874,222 | 10/1989 | Vacha et al. | 350/96.3 X |

FOREIGN PATENT DOCUMENTS 51-067309 6/1976 Japan.
57-146204 9/1982 Japan.

OTHER PUBLICATIONS

A. C. Beck et al., "Conductivity Measurements at Microwave Frequencies", Proc. IRE, Oct. 1950, pp. 1181–1189.
S. E. Miller, edit., Optical Fiber Telecommunications, Academic Press, 1979, pp. 263–298.
T. H. Wilmshurst, Electron Spin Resonance Spectrometers, Plenum Press, N.Y., pp. 199–204.

Primary Examiner—Akm Ullah
Attorney, Agent, or Firm—R. B. Havill; O. E. Alber

[57] ABSTRACT

A process for manufacturing an optical fiber includes the steps of heating and drawing material from a hot optical fiber preform; exposing the hot optical fiber to a compound containing carbon for depositing a carbon coating on the moving optical fiber; measuring an electrical property of the carbon coating; and in response to the measured electrical property, changing a parameter of the process for controlling a characteristic of the carbon coating on the moving optical fiber. Featured within the manufacturing method is a method for measuring the thickness of the carbon coating on the moving optical fiber. From the measured thickness of the carbon coating, a control signal is generated for changing one or more of the process parameters for depositing the carbon coating on the optical fiber from a precursor gas. The coated optical fiber continuously moves through the process without any physical contact. No interruption of the production process occurs.

9 Claims, 12 Drawing Sheets

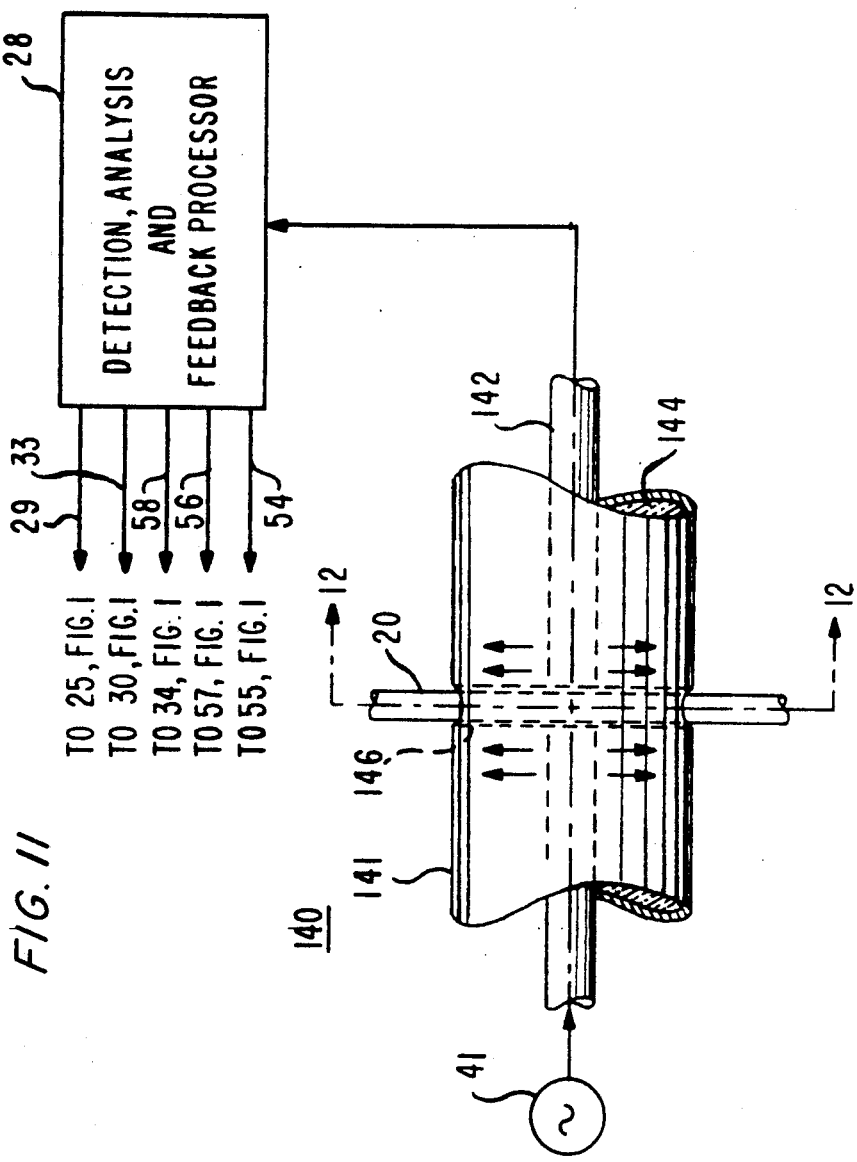

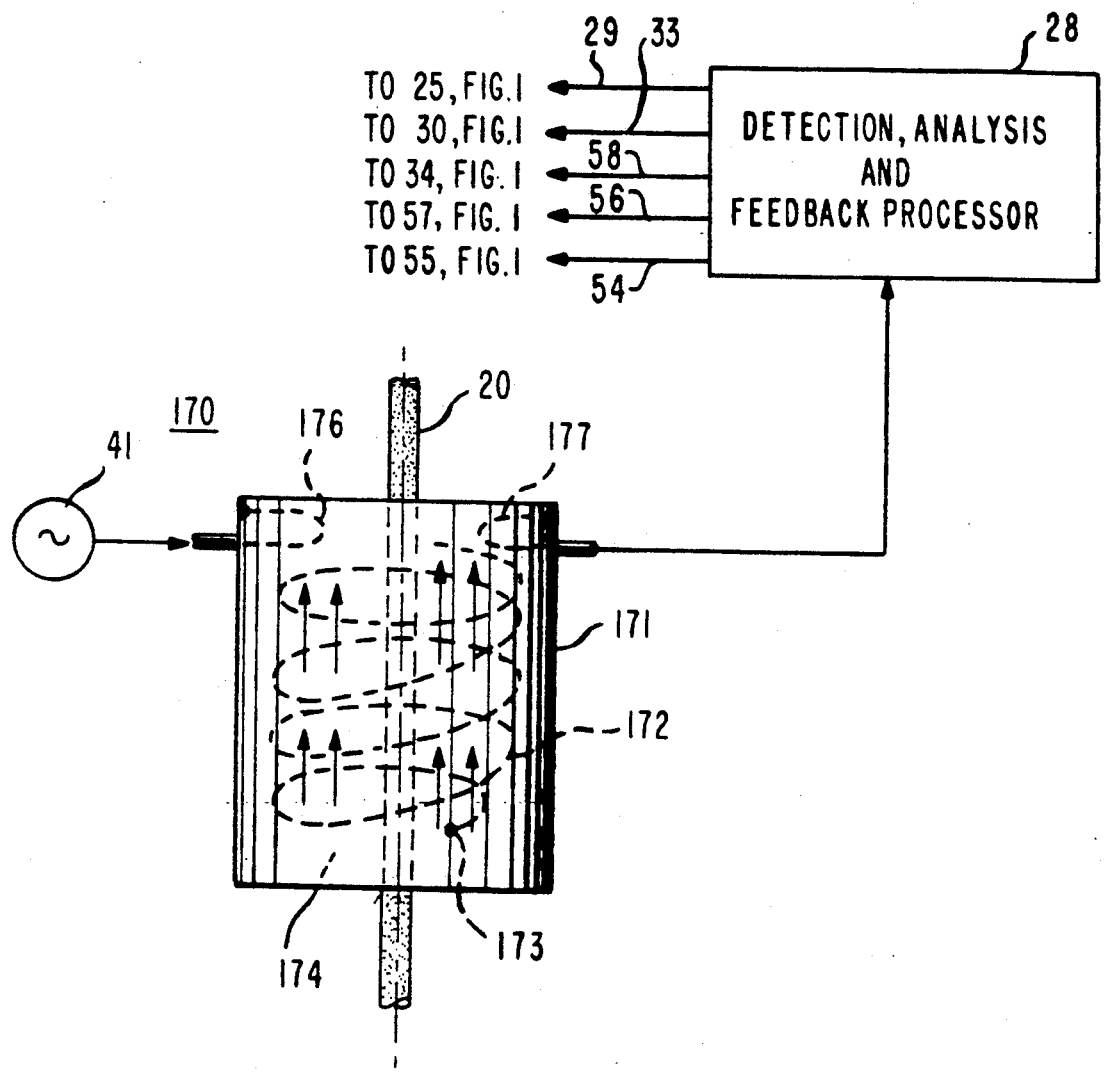

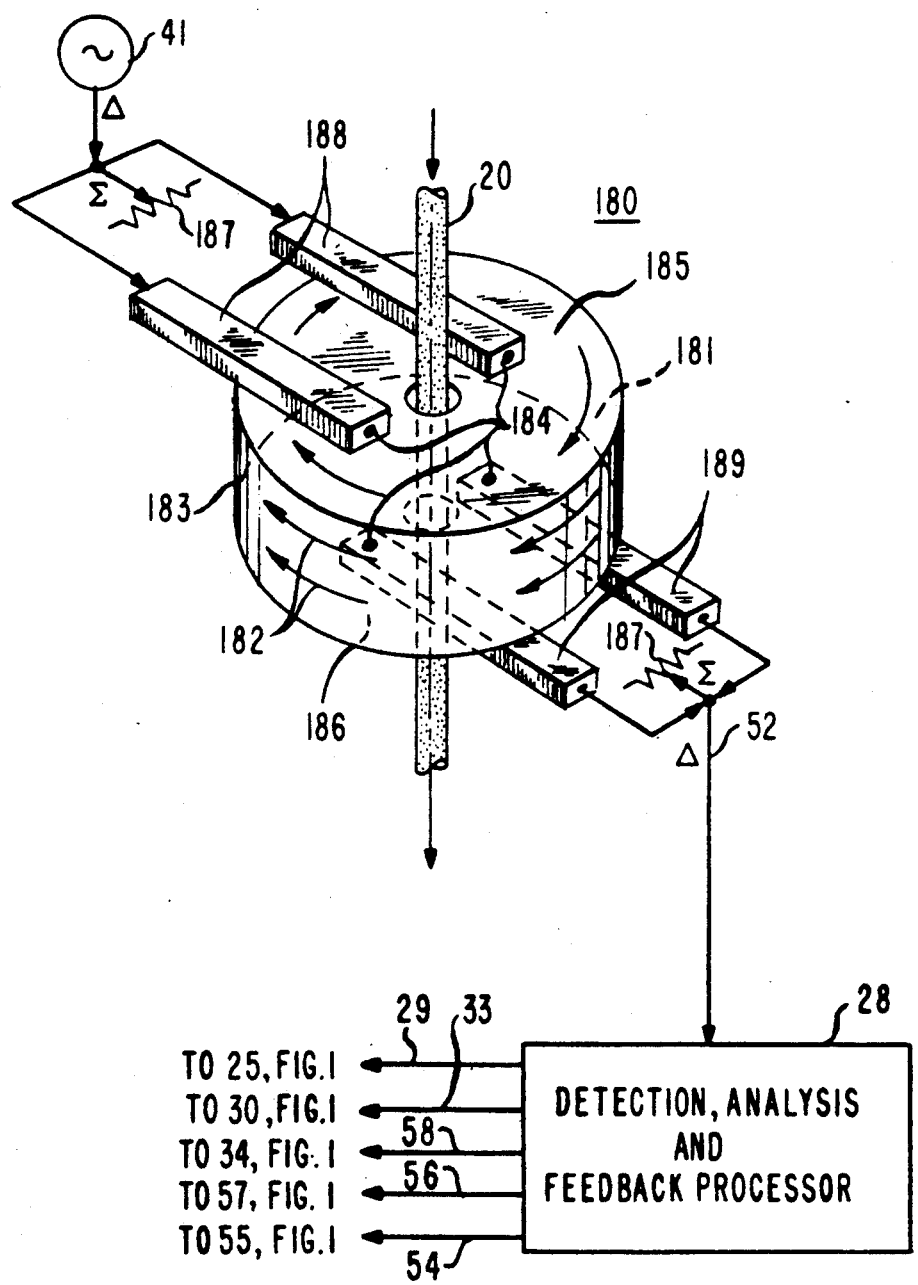

METHOD OF MAKING A CARBON COATED OPTICAL FIBER

This invention relates to a method used in making an optical fiber.

BACKGROUND OF THE INVENTION

Performance characteristics of optical fibers can be degraded by environmental elements. For example, the interaction of water with the surface of a silica fiber produces surface modifications which can reduce the strength of the fiber. Also over a period of time, hydrogen can diffuse into an optical fiber and increase the optical loss in a signal carried by that optical fiber.

In order to prevent such interactions, a coating can be applied to the fiber for preventing deleterious environmental elements from interacting with the fiber. Ideally such a coating acts as an impenetrable hermetic barrier between the fiber and the environment. One such coating, e.g., a carbon coating, is applied under stable ambient conditions to the outer surface of a silica cladding of the fiber by inducing decomposition of a suitable carbon containing organic precursor gas, e.g., acetylene, to form a thin carbon film on the fiber surface, as described by F. V. DiMarcello et al., in a U.S. patent application, Ser. No. 098253, filed Sept. 18, 1987 now abandoned. For optimum results, the carbon coating must be applied at a particular thickness within close tolerances. If the coating is too thin, it does not sufficiently limit the penetration of the undesirable environmental elements, such as water and hydrogen. On the other hand, if the coating is too thick, fiber strength can be reduced by microcracks which can form in the carbon coating when the fiber is under high tensile force.

A need therefore has arisen for a method to rapidly make the fiber while controlling the thickness of the coating being applied to the fiber. The method should allow continuous production of the fiber and avoid any direct contact with the fiber. Any interruption of the continuous drawing process is intolerable. Physical contact with an unjacketed optical fiber can damage the surface and reduce the tensile strength of the fiber. In the prior art, thickness of a coating has been measured by static off-line metrology, e.g., by electron microscopy or by calculation based on a direct current measurement of resistance in an electrical circuit. These methods require either the interruption of the drawing process, physical contact with the unjacketed optical fiber, or both.

SUMMARY OF THE INVENTION

These and other problems are solved by a new method for making an optical fiber. This manufacturing method includes the steps of: heating and drawing material from an optical fiber preform into an elongated moving optical fiber, exposing the heated optical fiber to a carbon containing compound for depositing a carbon coating on the optical fiber, measuring an electrical property of the carbon coating on the moving optical fiber, and in response to the measured electrical property changing at least one processing parameter for controlling a characteristic of the coating.

The following advantages are achieved by the foregoing method. The carbon coated optical fiber continuously moves through the process without any physical contact. No interruption of the production process occurs. In response to the measured electrical property, signals are generated for changing at least one parameter in the fiber manufacturing process to maintain desired tolerances of the carbon coating.

The general principles here stated can be applied over a wide range of radio frequencies, typically from about 10 MHz to 150 GHz, and can be applied to a wide range of coated fiber configurations by appropriately selecting a frequency range and equipment that is compatible with the selected frequency range.

BRIEF DESCRIPTION OF THE DRAWING

A better understanding of the invention may be derived by reading the subsequent detailed description thereof with reference to the attached drawing wherein:

FIG. 11 is a schematic diagram of a fifth arrangement for measuring the thickness of the coating on the optical fiber;

FIG. 12 shows a cross-section view taken from the arrangement of FIG. 11;

FIG. 15 is a schematic diagram of a seventh arrangement for measuring the thickness of the coating on the optical fiber; and FIG. 16 is a schematic diagram of an eighth arrangement for measuring the thickness of a coating on the optical fiber.

DETAILED DESCRIPTION

Figure 1:
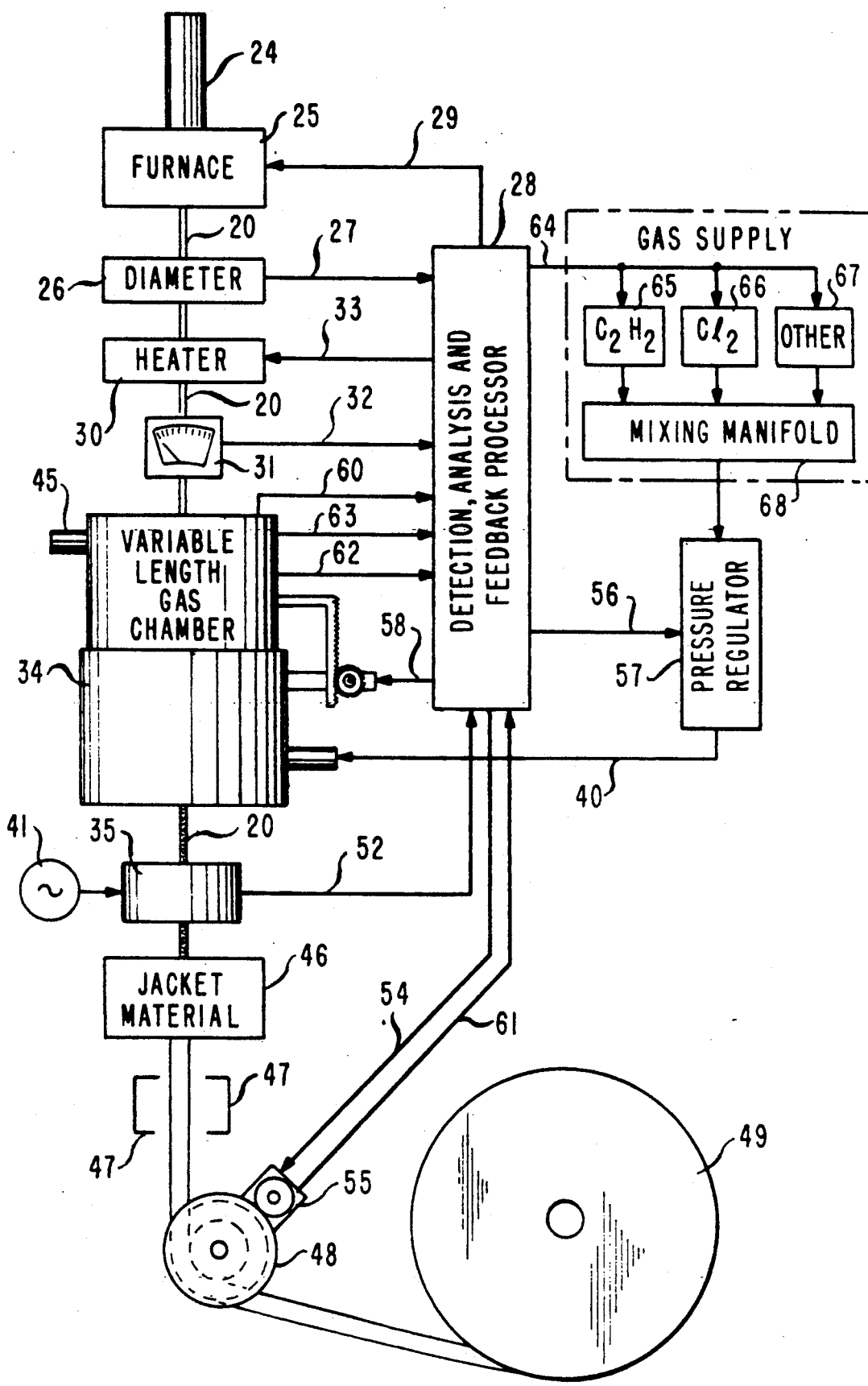
FIG. 1 is a schematic diagram of an arrangement for drawing an optical fiber and of apparatus for making measurements and controlling the drawing operation and the coating process.

Referring now to FIG. 1, there is shown a diagram of exemplary equipment for drawing an optical fiber 20 from a preform 24. The preform may include silica glass with predetermined dopants which will form an optical fiber having a low loss optical core section that is surrounded by a cladding section. The core and cladding sections have different indices of refraction so that light transmitted axially along the core is retained within the core because of internal reflections and/or confinement which occur due to the stratification of the refractive indicies.

A furnace 25 surrounds at least the lower end of the preform 24 and heats that end to its melting or softening temperature. The fiber 20 is drawn from the end of the preform 24 at a velocity, or rate, that is known to produce the elongated fiber 20 with a predetermined diameter. Generally the fiber is drawn from the preform at a controlled steady temperature and velocity. Other combinations of temperature and velocity, or rate, of the draw can be used for producing fibers with the same diameter.

During the drawing operation, the fiber 20 moves through a diameter gauge 26 which produces on a lead 27 a signal representing the diameter of the fiber. That signal is forwarded to an input of a detection, analysis and feedback processor 28. A control signal produced by the processor 28 is carried by a lead 29 for dynamically controlling the temperature of the furnace 25.

Thereafter the fiber 20 moves through an optional heater 30 for suplementing the residual heat in the fiber 20, if desired, and a thermometer, or pyrometer, 31 for monitoring the temperature of the fiber 20. Temperature measured by the thermometer 31 is applied through a lead 32 to the processor 28, which produces a signal on a lead 33 for dynamically controlling the temperature of the heater 30. In a variable length, or telescoping, chamber 34, an exemplary mixture of acetylene precursor gas together with chlorine and an inert gas, such as nitrogen, argon, or helium, is applied to the hot moving silica surface of the fiber 20 for pyrolyzing, or inducing decomposition of the acetylene precursor gas, and depositing a carbon coating uniformly around the periphery of the fiber. Chlorine is used as a getter for free hydrogen. The coating deposition process occurs in controlled ambient conditions, which typically are constant. While the fiber is moving and without it contacting any apparatus, the thickness of the carbon coating is controlled continuously within tolerances to effectively hermetically seal the optical fiber 20 from any subsequent contact with either water or hydrogen during fabrication, installation, or use of the fiber in a transmission system. At the same time, vulnerability of the coating to cracking under tensile load due to excessive coating thickness is limited to maintain an acceptable level of fiber strength.

Figure 2:
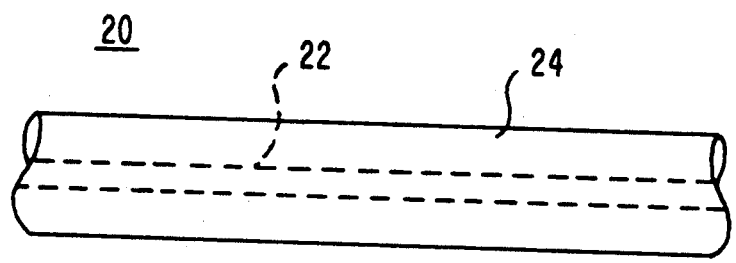
FIG. 2 is a diagram of a section of optical fiber without its polymeric jacketing.

Referring now to FIG. 2, there is shown a diagram of the bare optical fiber 20 including a center core 22 and cladding 24. Although not shown in FIG. 2, there may be more silica layers than the core and single layer of cladding for bare optical fiber.

Figure 3:
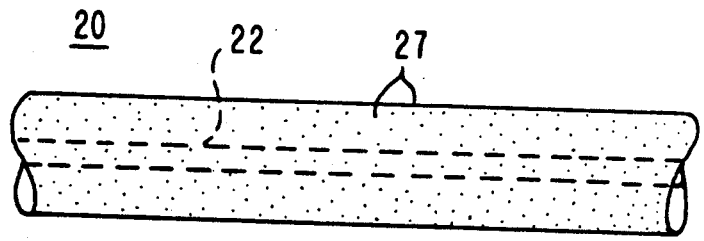
FIG. 3 is a diagram of a section of optical fiber coated with a carbon coating.

Referring now to FIG. 3, there is shown a diagram of the optical fiber 20 coated with a thin layer of carbon 27, as represented by dots overall.

After the carbon coating is applied to the moving fiber 20 of FIG. 1, the coated fiber moves on through a radio frequency resonant cavity 35 for measuring the thickness of the carbon coating. Radio frequency is an electromagnetic wave frequency intermediate between audio frequency and infrared frequency. A cavity in the microwave range of frequencies has been used successfully because of component sizes and availability. A microwave is a very short wavelength electromagnetic wave, typically less than thirty centimeters in wavelength. Upon exiting from the resonant frequency cavity 35, the fiber 20 moves on through one or more vessels 46 which are filled with ultraviolet light curable liquid materials that are subsequently transformed into polymeric solids for jacketing the fiber 20 to protect its surface from future mechanical damage resulting from incidental or accidental contact. This transformation to the polymeric solid is made by a set of lamps 47 applying ultraviolet light. Once the jacket is formed on the fiber 20, it is wound about a capstan drive 48 and then onto a reel 49 for storage and for convenience of handling until the fiber is installed in a transmission system. Speed of the capstan drive 48 and of the fiber are sent to the processor 28 via a lead 61.

Two exemplary subsystem control the previously described optical fiber drawing operation. The first control system including the diameter gauge 26 determines the diameter of the fiber by a measurement made in an optical chamber and, by analysis in the processor 28, converts such measurement into fiber diameter control signal. This fiber diameter control signal is applied by way of the lead 29 to the furnace 25 for continuously adjusting the furnace temperature and/or by way of a lead 54 to the capstan drive control 55 or continuously adjusting the drawing speed so that the fiber diameter is kept within predetermined tolerances. Controlling fiber diameter by operation of the furnace and the drawing speed are described in detail in a textbook, entitled "Optical Fiber Telecommunications" edited by S. E. Miller et al., Academic Press, Inc., 1979, pp. 263-298. Such text is incorporated herein by reference.

Another control system measures and controls the thickness of the carbon coating that is applied to the surface of the moving optical fiber 20 without physically contacting the unjacketed fiber. This method for measuring and controlling the thickness of the carbon coating operates continuously on one or more of the following parameters: fiber temperature, acetylene gas pressure, time the fiber is exposed to acetylene, or acetylene gas concentration; and is an example of the new method of the invention which is described in detail hereinafter. Pressure in the chamber 34 is transmitted by way of a lead 62 to the processor 28. An optional signal for controlling the pressure is sent from the processor 28 via a lead 56 to a pressure regulator 57. An indication of the concentration of the acetylene gas is forwarded from the chamber 34 by way of a lead 63 to the processor 28. An optional signal for controlling the mixture of gases is transmitted from the processor 28 via a lead 64 to gas supply valves 65, 66 and 67. The gases are mixed in a manifold 68 and delivered through the pressure regulator 57 and supply line 40 to the gas chamber 34. Although the cavity 35 is shown preceding the ultraviolet light curable jacketing supply vessels 46, the cavity 35 could be located after the vessels 46 or after the set of lamps 47.

Figure 4:
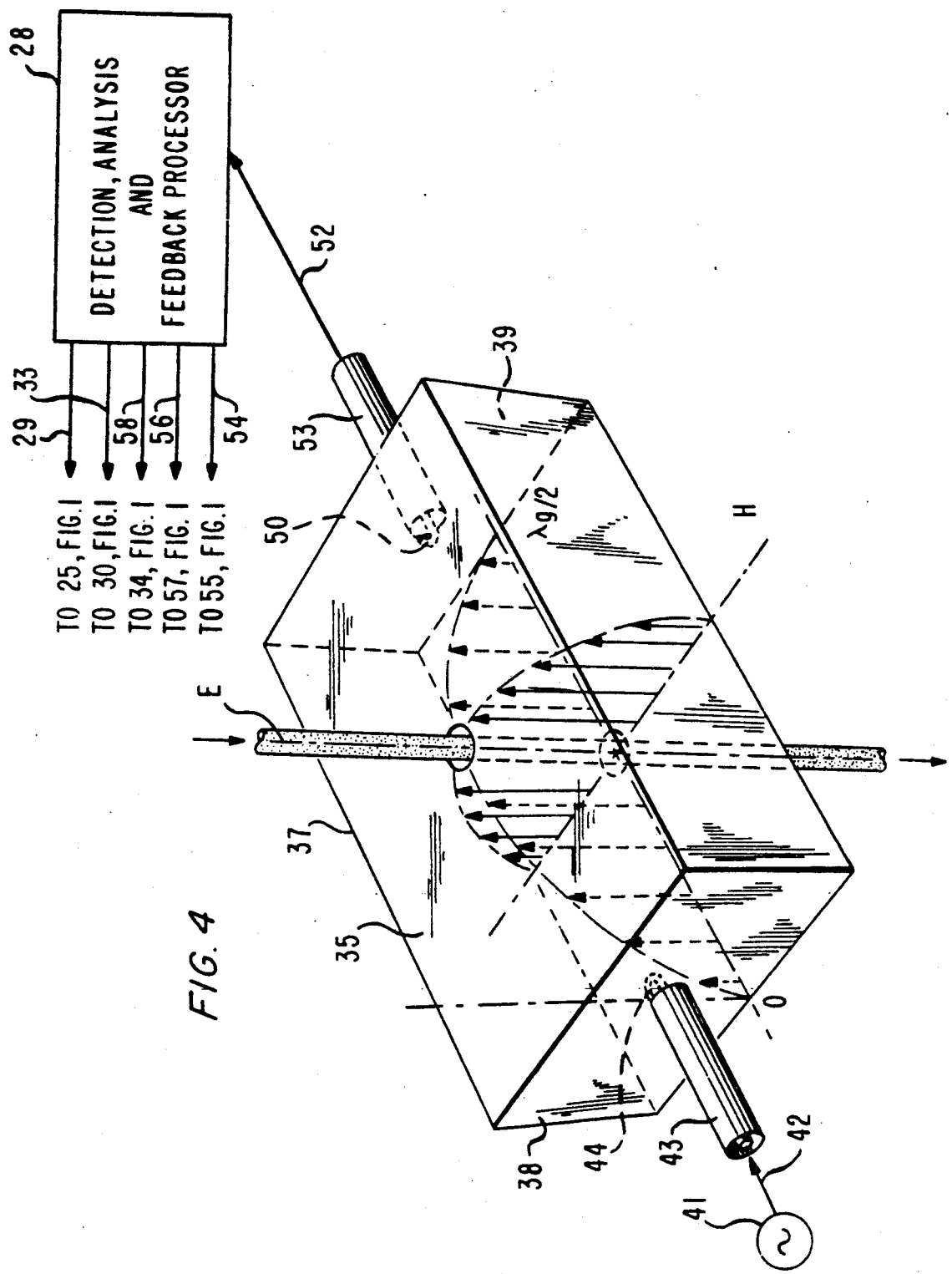
FIG. 4 is a schematic diagram of an arrangement for measuring the thickness of the conductive carbon coating on the optical fiber.

Referring now to FIG. 4, there is shown a detailed perspective view of the exemplary resonant cavity 35 for operation in the microwave frequency range. Shown in FIG. 4 is a section of hollow rectangular waveguide 37, which has a length equal to a half guide wavelength at the operating frequency. Each end of the waveguide section is shorted by one of the conducting plates 38 and 39. A microwave frequency input signal, produced by a fixed or swept frequency signal generator 41, is coupled through a coaxial line 42, a connector 43, and an opening through the shorting plate 38 to a loop 44 of the center conductor to ground. This magnetic input loop is positioned inside of the resonant cavity to energize a resonant electromagnetic field in response to the applied input signal. Power levels of the input signal typically can be in the range of a fraction of a milliwatt to about 100 milliwatts.

According to the standard adopted for FIG. 4, the array of arrows represent the electric field vectors in the resonant cavity at resonance. These electric field vectors present an instantaneous condition of a continuously alternating electric field. Longitudinally from the input, the amplitude of the electric field represents a standing wave that increases from zero at the input shorting plate 38 to a maximum amplitude at the center of the cavity. As shown on an axis along the bottom of the cavity, there is shown a scale marking off a half guide wavelength $\lambda_g/2$ between the input shorting plate 38 and the output shorting plate 39. The amplitude of the electric field decreases to zero at the output shorting plate 39. Although the length of waveguide section 37 is shown as one half guide wavelength at the operating frequency, other multiples of a half guide wavelength can be used.

At the center cross-section of the cavity, there are shown two intersecting planes of arrows representing the electric field for the standing wave. This electric field has a maximum amplitude at or near the center of the cavity and an amplitude that also decreases to zero at both sides of the waveguide.

A coated optical fiber moves through openings cut into the top and bottom walls of the section of waveguide. These openings are positioned opposite each other so that the optical fiber is readily threaded therethrough and moves continuously without physically contacting the waveguide structure. The openings are placed where the electric field has sufficient strength to provide a useful signal and is sufficiently uniform to make convenient measurements on the moving fiber during the fiber coating operation.

Although it is not shown in FIG. 4, there is a magnetic field which exists concurrently with the electric field. Such magnetic field is directed at a right angle with respect to the direction of the electric field. Together the electric field and the magnetic field make up an electromagnetic field within the resonant cavity in response to the energizing input signal.

An output signal can be extracted from the resonant cavity by either an electric field probe or a magnetic field probe. In either case the probe is positioned so that it interacts with the appropriate field where the field strength is sufficient to produce a useful output signal.

As an example in FIG. 4, consider that an output signal is extracted from the cavity by an output magnetic field loop 50 that is inserted into the cavity through an opening in the output shorting plate 39. This output coupling loop is formed, e.g., by bending the center conductor of a coaxial connector 53 to the output shorting plate 39. Coaxial line 52 transmits output signals from the output coupling loop 50 and the connector 53 to the detection, analysis and feedback processor 28.

It is important to emphasize that although the energy insertion, or input, coupling loop 44 and the energy extraction, or output, coupling loop 50 are shown as magnetic field probes positioned for optimum magnetic field strength, they may be replaced by input and output electric field probes appropriately positioned for an electric field. As an alternative to the coaxial probe arrangement, other waveguide transmission media can be substituted for the connectors 43 and 53 by coupling through appropriate holes in the shorting plates 38 and 39.

Figure 5:
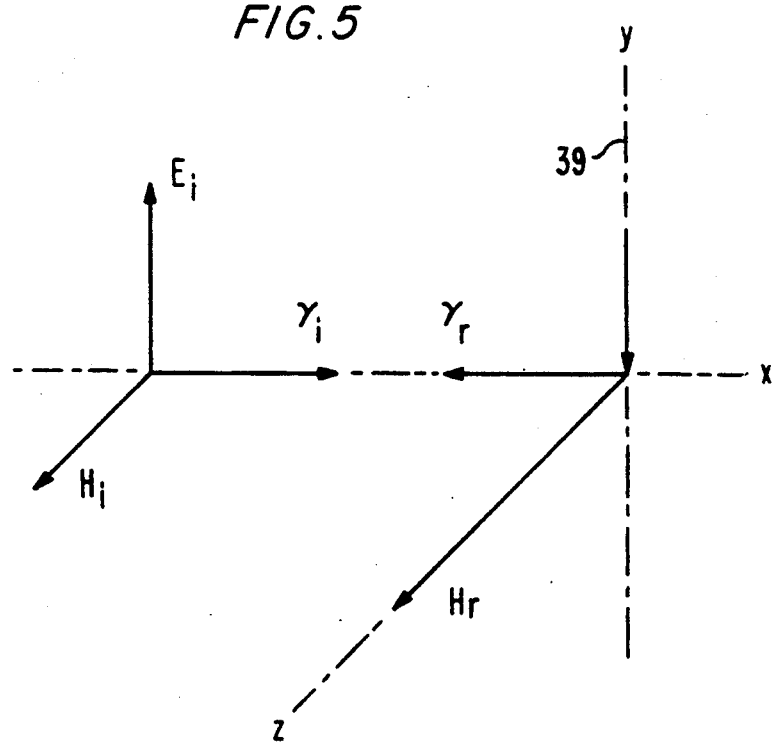
FIG. 5 is a perspective drawing of the vectors of an incident electromagnetic wave and its resulting reflected electromagnetic wave produced at a short circuit termination.

Referring now to FIG. 5, there is shown a graph of vectors representing the electromagnetic energy at the shorting plate 39 of FIG. 4. At the left of the origin of the three dimensional x, y, z axis, there are an incident electric field vector $E_i$, an incident magnetic field vector $H_i$, and a velocity vector $\gamma_i$ for the incident electromagnetic wave. It is noted that the electric field vector is oriented in the positive vertical direction and that the magnetic field vector is oriented horizontally on the three dimensional axis. When the incident wave reaches the output shorting plate 39 located at the origin of the horizontal axis, a reflected wave is produced. Since there is a short circuit, the effective voltage is zero and the reflected electric field $E_r$ is oriented in the negative vertical direction. The magnitude of the reflected electric field $E_r$ equals the magnitude of the incident electric field $E_i$.

At the same location, the incident magnetic field $H_i$ also is reflected. For the reflected magnetic field $H_r$, polarity is the same as the incident magnetic field $H_i$, but amplitude is doubled because of the output shorting plate 39. Also the reflected velocity vector $\gamma_r$ is reversed in direction from the incident velocity vector $\gamma_i$.

Exemplary input and output magnetic coupling loops 44 and 50 of FIG. 4 are oriented to couple energy into and extract energy from the resonant cavity at or near the points of maximum magnetic field. Alternatively those loops may be located at points with sufficient magnetic field to produce a useful signal at the output coupling probe 50.

The exemplary detection, analysis and feedback processor 28 of FIGS. 1 and 4 performs multiple functions. Among those functions there are: (1) the production of an output signal power versus frequency characteristic curve for the resonant cavity 35, (2) comparing the output signal power versus frequency characteristic curve to a reference characteristic curve, (3) determining the difference between the output signal characteristic and the reference characteristic curve, (4) by way of a lead 56 sending a control signal related to that difference to a control element 57 of FIG. 1 for dynamically changing the flow of or the partial pressure of the acetylene precursor gas, (5) by way of the lead 54 for dynamically changing the speed of the drawing operation to control the fiber temperature as it enters the acetylene chamber, (6) by way of a lead 58 for changing the length of the chamber 34 to control the time of exposure to the acetylene, and (7) by way of the lead 33 for changing the temperature of the fiber. The changes of these aforementioned coating process parameters are made for changing some property of the carbon coating being deposited on the moving fiber. To control any specific coating process, one or more of these parameters is controlled.

Figure 6:
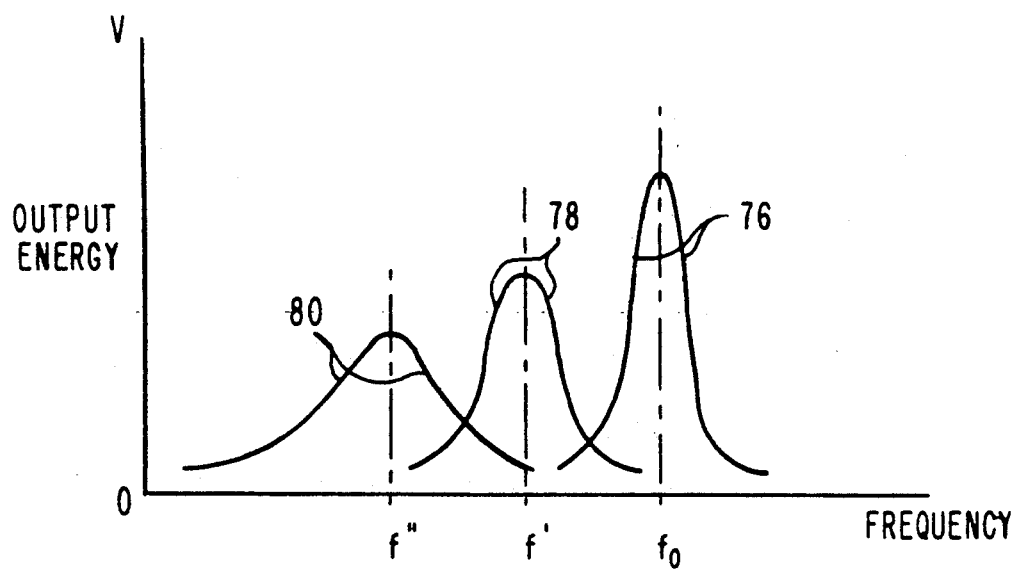
FIG. 6 is a series of curves representing output energy versus frequency for different measurements taken on an optical fiber.

Referring now to FIG. 6, there is shown a plot of the output energy versus frequency response curve for three different resonant conditions of the cavity 35 of FIG. 4. In FIG. 6 a narrow, spiked response curve 76 represents the output signal energy versus frequency for the empty cavity 35 or for the cavity 35 with an uncoated optical fiber 20 inserted therein. Since the optical fiber 20 is fabricated basically in silica, a dielectric, the fiber is an electric insulator, or nonconductor, and causes very little effect on the empty cavity response curve. Response curve 76 is useful reference for control purposes.

Two other response curves 78 and 80 represent curves of the desired upper and lower limits on the thickness of the carbon coating which is deposited on the optical fiber 20 of FIG. 4. What we have realized is that because carbon is conductive and because the coating is substantially aligned with the electric field in the cavity, that field induces a current in an axial direction along the conductive carbon coating on the fiber. Conductivity is a number equal to the magnitude of current conducted from one face of a unit cube of the coating material to the opposite face of that cube when a unit potential difference is maintained between those two faces. Being a conductor, the carbon coating is capable of carrying an electric current. Such a current alternates in direction at the frequency of the applied electric field and creates a magnetic field around the fiber 20. This action distorts the electromagnetic field in the cavity and dissipates or absorbs power. As a result, the output energy versus frequency curve is reduced in amplitude and spread out from the shape of the narrow empty cavity response curve 76, and the resonant frequency changes. A continuous family of curves results. Only three curves of the family are shown in FIG. 6. By calibrating the resulting response curves for the desired range of electrical conductance and therefore carbon thickness, the output response curves 78 and 80 and others of the family are subsequently useful in comparison with the curve 76 for measuring the feature of thickness of the carbon coating as it is deposited on the optical fiber 20. Typically conductance is a ratio of the current carried by the coating to the apllied electromotive force (it is the reciprocal of electrical resistance) at d.c. For our purpose, we are measuring an effective radio frequency conductance. Conductance depends upon conductivity of the coating and the feature of thickness of the coating.

The detection, analysis and feedback processor 28 analyzes the output energy versus frequency data of FIG. 6 continously during a fiber drawing operation. From the values of amplitude and frequency of the family of curves in comparison with the curve 76, the processor 28 continuously determines both the quality factor Q or the cavity and the conductance of the coating. Such a conductance determination or measurement is readily convertible to thickness data of the coating and to a determination of whether or not the thickness data is within the desired limits. As a result of the processing, the processor 28 generates a signal which when fedback to control the coating process maintains the carbon coating thickness within the desired limits by controlling one or more of the process parameters: fiber temperature, precursor gas density, fiber exposure time, or precursor gas pressure.

Figure 7:
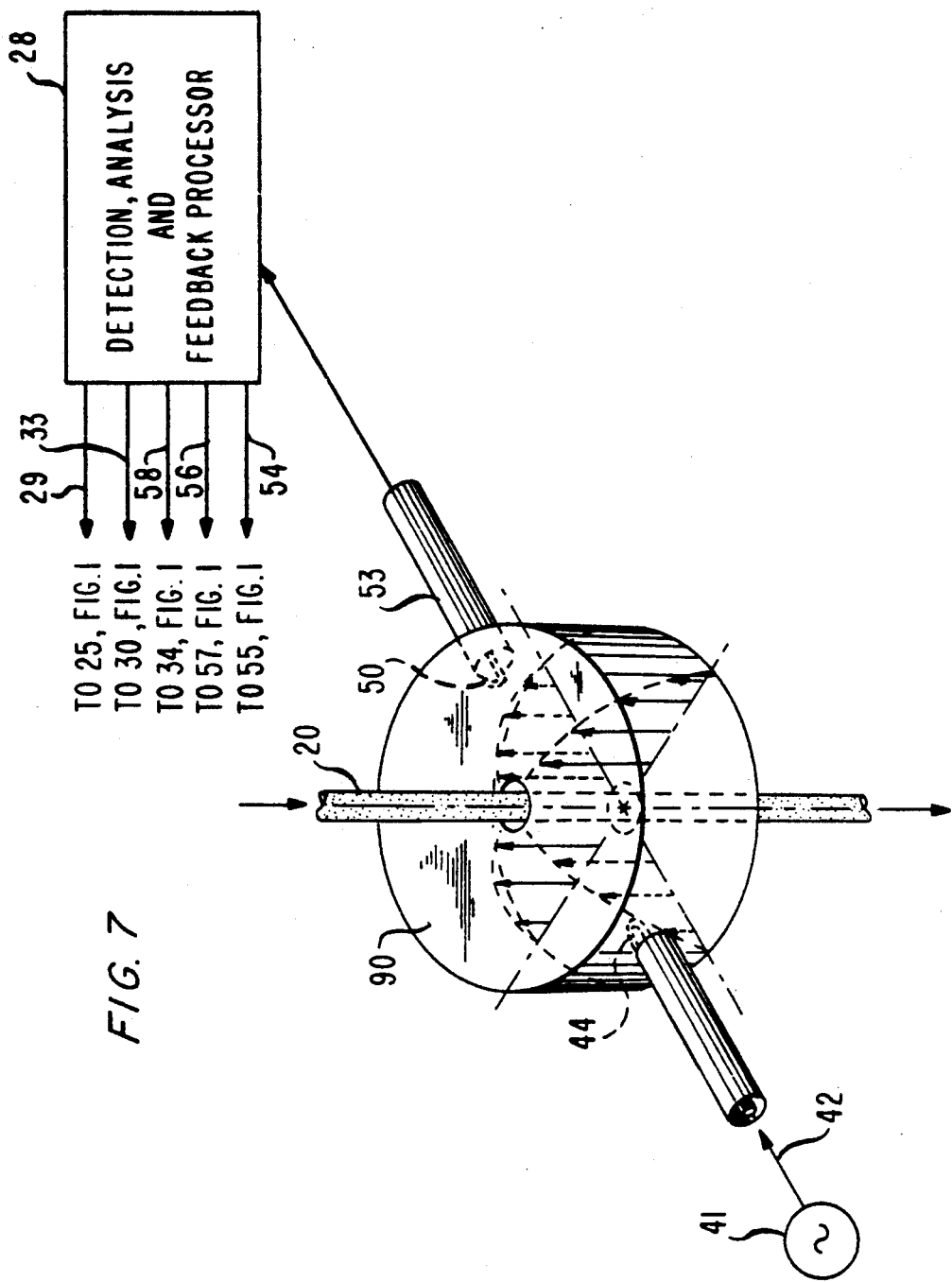
FIG. 7 is a schematic diagram of another arrangement for measuring the thickness of the coating on the optical fiber.

Referring now to FIG. 7, there is shown another configuration of a resonant cavity 90. Except for the round cylindrical shape of the cavity 90, the arrangement and operation of FIG. 7 are similar to the apparatus of FIG. 4. The optical fiber 20, coated with carbon, moves through the cavity 90 in a path so that the coating is aligned with the energized electric field in the cavity. For the fiber 20, entrance and exit openings in the cavity 90 are located at or near the positon of sufficient electric field strength to produce a detectable output signal. Thickness of the carbon is controlled by a feedback control signal generated by the detection, analysis and feedback processor 28, as described previously.

Figure 8:
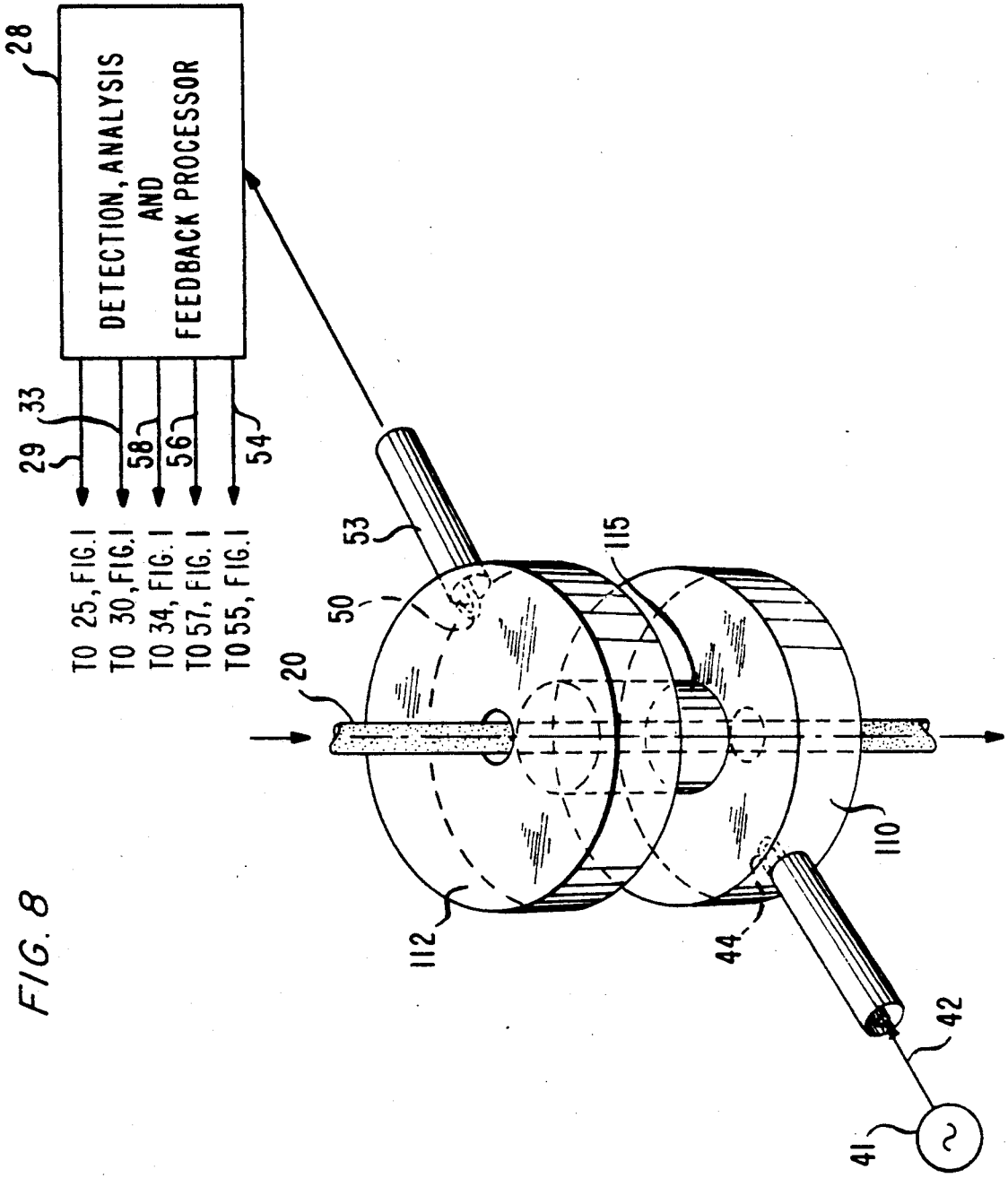
FIG. 8 is a schematic diagram of a third arrangement for measuring the thickness of the coating on the optical fiber.

Referring now to FIG. 8, there is shown another arrangement for determining the thickness of the carbon coating on the moving optical fiber. In FIG. 8 there are two round cylindrical cavities 110 and 112 with an intercoupling section 115. When the signal source 41 applies an alternating current signal through the line 42 and the loop 44 to the cavity 110, an electromagnetic field is established therein. Some of the energy from the electromagnetic field in the first cavity 110 is coupled through the coupling section 115 into the second cavity 112. From the second cavity, output signal energy is coulped into the output coupling loop 50 and is transmitted to the detection, analysis and feedback processor 28.

The carbon coated optical fiber 20 moves through an entrance opening, the second cavity 112, the coupling section 115, the first cavity 110, and an exit opening. Thickness of the carbon coating is determined by the same procedure as previously. Thickness is measured by the processor 28 which also determines a control signal that controls at least one parameter of the carbon depositing operation illustrated in FIG. 1.

Figure 9:
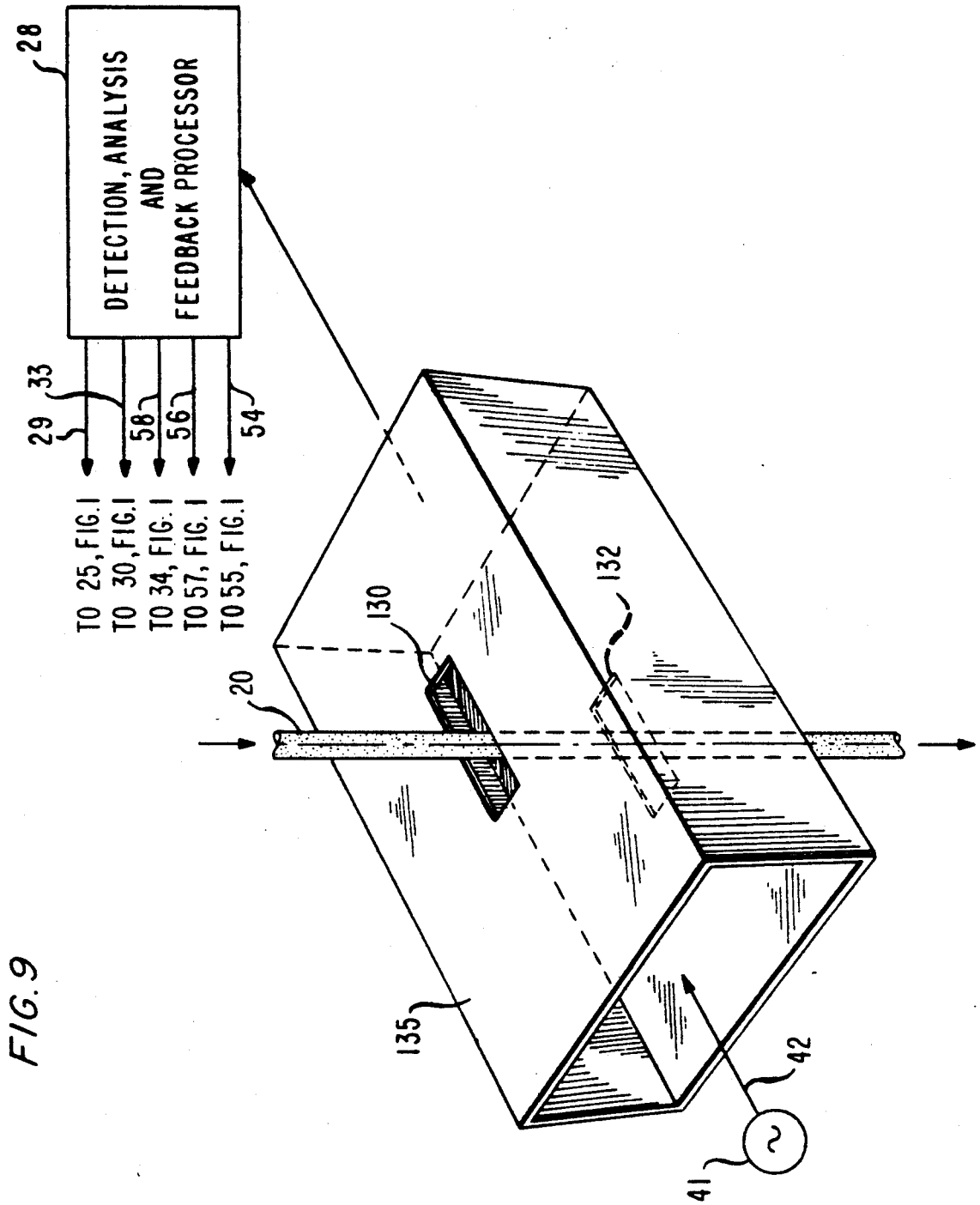
FIG. 9 is a schematic diagram of a fourth arrangement for measuring the thickness of the coating on the optical fiber.

Referring now to FIG. 9, there is shown the carbon coated optical fiber 20 moving through longitudinal slots 130 and 132 in a section of waveguide 135. From the source 41 and the line 42, the waveguide is energized with a propagating electromagnetic field. Slots 130 and 132 are cut in the centerlines of opposite broad faces of the section of waveguide. The slots should be as narrow as reasonably possible consistent with the fiber never contacting the slot boundaries.

For convenience of available parts and the sizes of those parts, a section of WR90 waveguide and a klystron oscillating at 10.5 GHz were chosen for the arrangement. A crystal diode is used for the detector at the output end of the waveguide 135. Matching sections are used for connecting the klystron and the detector to the section of waveguide. At low incident power levels, e.g., less than 100 microwatts, the output current of the detector is proportional to the square of the electric field in the waveguide. That output current is therefore proportional to output power. The foregoing specific items and parameters are mentioned by way of example. Other sizes, frequencies and power levels also are useful.

As previously mentioned, the input signal, applied by the klystron in FIG. 9, creates a propagating electromagnetic field in the section of waveguide. In the unlikely event that the arrangement is prefectly matched, the magnitude of the time averaged vertical electric field is constant along the entire axis of the section of waveguide 135 in the absence of the coated fiber. In that case the position of the fiber along the slot is not important. In the more likely event that the arrangement is mismatched, there are standing wavers present and at least a partially resonant condition in the section of waveguide 135. In the mismatched arrangement, there are positions of greater electric field strength where more power is absorbed by the conductive coating. A deliberate mismatch can be created by tuning screws and/or irises in the waveguide. In this mismatched case, the fiber is deliberately located in a longitudinal position coincident with an electric field maximum which corresponds to a minimum longitudinal field gradient.

When the fiber 20, with the conductive carbon coating, moves through the waveguide, the conductive coating interacts with the electric field component which is parallel with the axis of the fiber. Transmitted power is reduced by the creation of an alternating current in the carbon coating. The amount of power lost is a function of the conductance of the carbon coating on the fiber. For a uniform outside diameter optical fiber, conductance of the carbon coating depends upon the conductivity of the carbon and the carbon coating thickness, which is a variable.

Thus depending upon the variable thickness of the carbon coating, the detection, analysis, and feedback processor 28 will measure a variable transmission loss for a specific constant input signal power at a given frequency.

Figure 10:
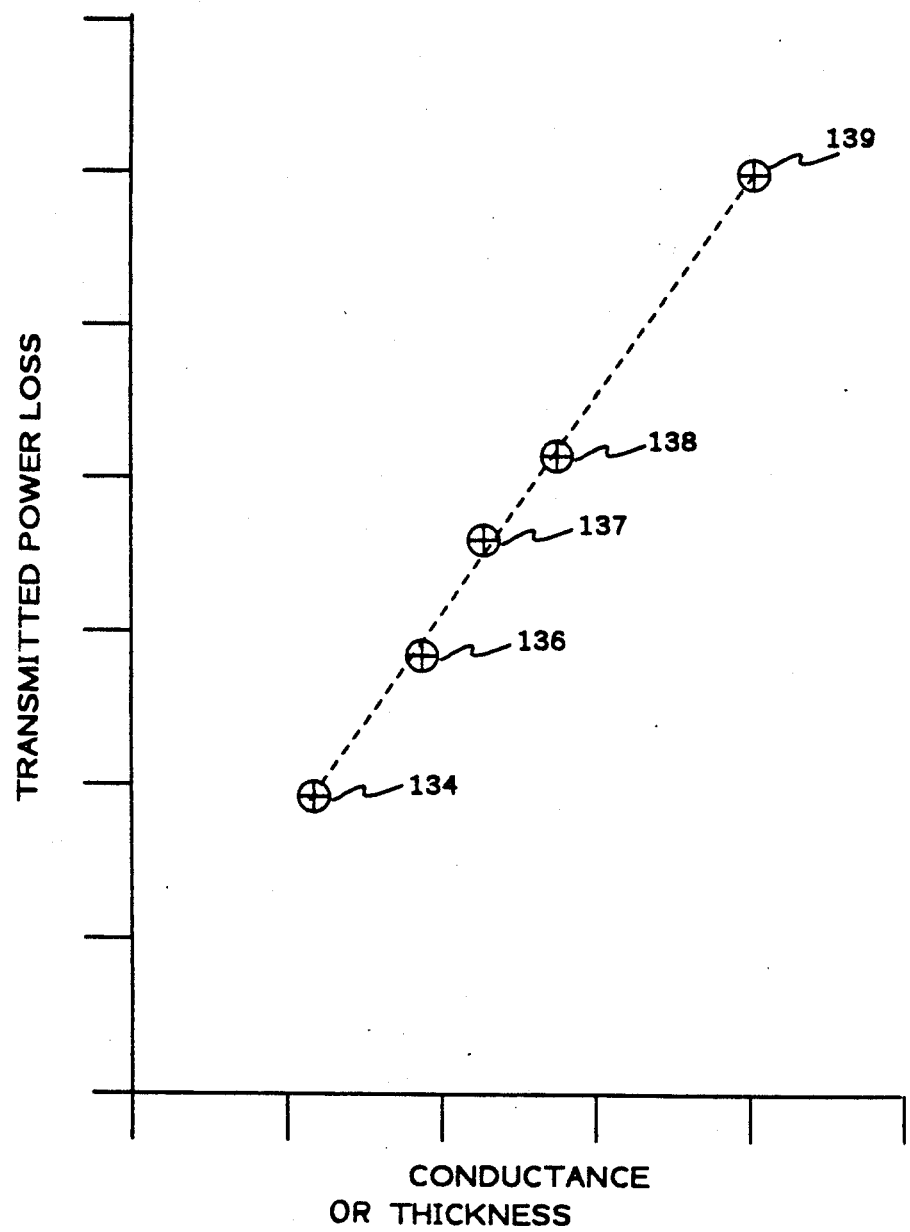
FIG. 10 is a transmitted power loss versus conductance, or thickness, characteristic for an exemplary coated fiber.

FIG. 10 shows the result of measurements 134, 136, 137, 138 and 139 of transmitted power loss versus conductance or thickness of some practical examples of carbon coatings.

Referring now to FIG. 11, there is shown a section of a coaxial transmission line 140 having an outer cylinder conductor 141 and a center conductor 142 separated by a dielectric 144. When this coaxial transmission line 140 is energized by an alternating current signal source 41, an electromagnetic field is established along its length. Detection, analysis and feedback processor 28 determines the magnitude of the output signal at the far end of the section of coaxial transmission line 140. Along a selected diameter of the coaxial transmission lines 140, there is a hole 146 cut all of the way through the coaxial transmission line. The optical fiber 20 to be measured moves through the hole 146 during the fiber drawing operation.

Since the energized electromagnetic field establishes a radial electric field, as shown in the cross section of FIG. 12, there are components of that electric field which are oriented more or less parallel with the coating on the fiber 20, as shown in FIGS. 11 and 12. The conductive carbon coating will have an alternating current induced by the components of the radial electric field. Thus power is absorbed or dissipated by the carbon coated fiber, and the resulting reduction of output signal power is measured by the detection, analysis and feedback processor 28.

Figure 13:
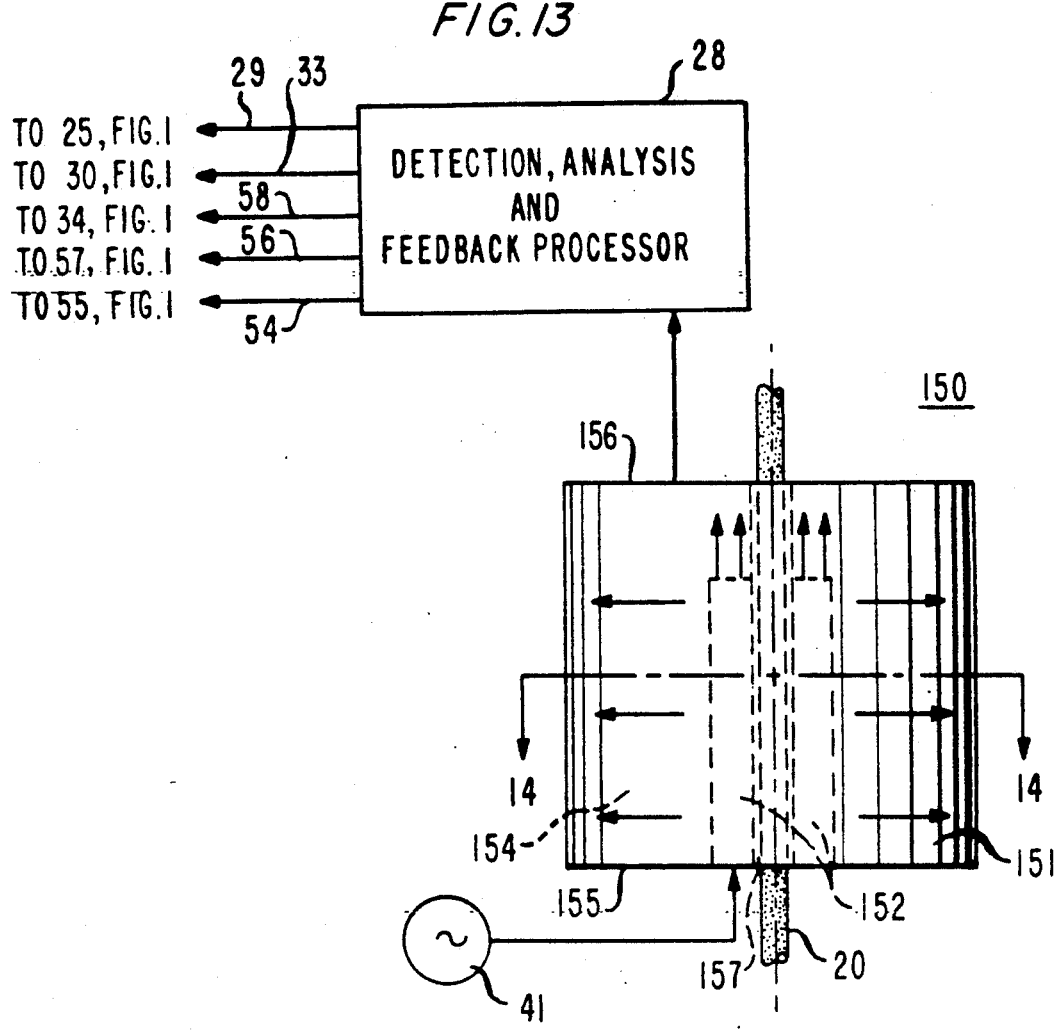
FIG. 13 is a schematic diagram of a sixth arrangement for measuring the thickness of the coating on the optical fiber.
Figure 14:
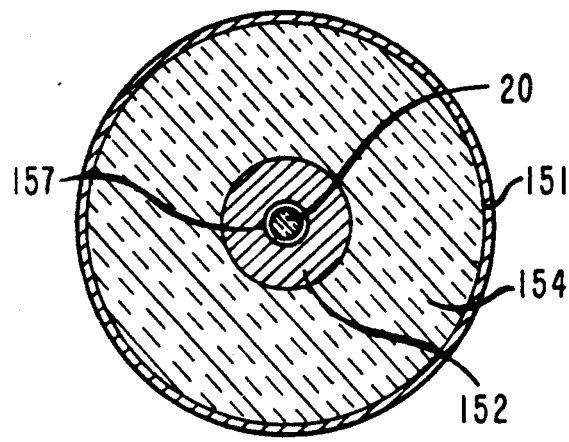
FIG. 14 shows a cross-section view taken from the arrangement of FIG. 13.

Referring now to FIG. 13, there is shown a coaxial resonator arrangement 150 for measuring and controlling the thickness of the carbon coating on the optical fiber 20. An outer concentric conductor 151 and a center conductor 152 are separated by a dielectric 154. Shorting plates 155 and 156 are affixed to each end of the coaxial resonator 150. A center hole 157 is cut through the entire arrangement along the center axis of the center conductor 152, as shown in FIG. 14. The coaxial resonator arrangement 150 of FIG. 13 is energized by a source of alternating current signals 41 to create an electromagnetic field indicated by arrows in dielectric 154.

During a drawing operation for the fiber 20, the portion of the electric field which is aligned with the axis of the fiber 20 induces an alternating current in the conductive carbon coating on the moving fiber. Detection, analysis and feedback processor 28 measures the thickness of the carbon coating and produces a signal which controls the carbon deposition process.

In FIG. 15 the measuring arrangement 170 includes a conductive chamber 171 and a conductive coil 172, affixed only at one end 173 to the conductive chamber 171 and generally separated from the chamber by a dielectric 174, such as air. The coil 172 can be fabricated from a superconductor material. By energizing the coil 172 with a radio frequency signal from a source 41 using an input coupling loop 176, an electromagnetic field is established within and along the coil 172. With proper design of the arrangement 170, the alternating electric field component is strong along the center axis of the coil 172, as shown by the arrows directed along the center axis. The carbon coated fiber 20 moves through the electric field and absorbs power from it. Detected power is extracted from the resonator by way of an output coupling loop 177. Electrical coupling can be substituted for the input and/or output magnetic coupling loops. The transmission response is related to conductance of the carbon coating. Detection, anaylsis and feedback processor 28 determines the thickness of the conductive carbon coating and develops a signal for controlling at least one parameter of the the carbon deposition process.

In FIG. 16 the measuring arrangement 180 includes a circular electric $TE_{01}$ mode resonant cavity 181 operated in the millimeter wavelength band so as to develop a circumferential electric field of sufficient magnitude at the surface of the optical fiber 20 to permit significant interaction between the conductive coating around the periphery of the fiber and the resonant cavity behavior. Here to assure $TE_{01}$ mode operation, the cylindrical wall 183 can be an anisotropic conductor, i.e., one that favors circumferential wall current flow and discriminates against axial wall current flow, such as described by S. E. Miller in U.S. Pat. No. 2,848,696, which is incorporated herein by reference. Other higher order circular electric modes can also be used in the cavity.

In order to assure efficient launching and detection of the $TE_{01}$ mode and discrimination agaisnt other unwanted modes, antiphased magnetic probes—in the form of small waveguide coupling holes 184—have been introduced into the waveguide cavity short circuit end plates 185 and 186. The antiphase arrangement in this example is illustrated by feeding a microwave source 41 into the difference port Δ of a hybird junction and waveguides 188 and by extracing output signals from the cavity via the waveguides 189 and another hybrid. The sun ports Σ of the hybrids are terminated by termination elements 187.

As in the prior examples discussed, the resonant cavity behavior is that shown in FIG. 6. Output energy is coupled through the difference port Δ and the lead 52 to the detection, analysis and feedback processor 28 for measuring and controlling the thickness of the coating on the otpical fiber 20.

To minimize undesirable effects caused by ambient changes, we have used several techinques such as: practicing the fiber drawing process in a stable controlled environment; using a highly stable oscillator in a temperature controlled environment for the propagating electromagnetic field measurement set up shown in FIG. 9; using a Pound stabilizer, such as described by T. H. Wilmshurst, "Electron Spin Resonance Spectrometers", Plenum Press, New York, pages 199–204; using a stable power supply; using a mechanical configuration which minmizes distortion of the waveguide; using coaxial cable sections that produce no more than a small phase shift on flexing; using low thermal expansion waveguide sections; using minimum length microwave paths; and using a two arm system fed by a common source including two identical waveguide sensor systems—one as a reference, the other for measuring the effect of the coating fiber on the output power.

Whether these techniques are used or not depends upon the sensitiviy required and the severity of ambient changes in the test environment.

At the previously described two port devices have single port analogs that can utilize reflectometers or circulators to accomplish the same functions.

Control of the process for coating the optical fiber is achieved by sensing and adjusting one or more of the following four process parameters: (1) the temperature of the fiber entering the precursor gas chamber; (2) in the precursor gas chamber, the concentration of the acetylene gas including the carbon atoms to be deposited; (3) the acetylene pressure in the precursor gas chamber; and (4) the time duration of exposure of the hot fiber to the acetylene gas in the chamber. Upon close analysis, other arrangements—which might: (1) move the position of the precursor gas chamber; (2) change the length of the precursor gas chamber; (3) change the mixture of the gases; (4) vary the speed of the fiber draw; or (5) alter the temperature of the furnace—fundamentally alter one or more of the four described parameters of the manufacturing process.

Thus there has been described a method for making a coated optical fiber and changing a parameter of the process of depositing the carbon coating for controlling a feature of that coating on the moving optical fiber. The arrangements for performing this method of making and coating the fiber do not contact the fiber during the manufacturing operation. The described method together with other methods made obvious in view thereof are considered to be covered by the appended claims.

What is claimed is:

1. An optical fiber comprising a core and a cladding together with a coating of carbon for hermetically sealing the optical fiber, the optical fiber being made by the process of heating at least an end portion of an optical fiber perform and drawing material from the heated portion of the optical fiber preform into an elongated moving optical fiber;

exposing the moving optical fiber to a gaseous carbon-containing compound under conditions such that the compound decomposes in response to the heat in the optical fiber and a coating consisting primarily of elemental carbon is deposited on the surface of the optical fiber in a thickness which is thick enough to effectively hemetically seal the optical fiber and, yet thin enough to avoid vulnerability of the carbon coating to cracking which could lead to a reduction in the fiber strength;

measuring contactlessly an electrical property at least partially dependent upon thickness of the carbon coating deposited on the moving optical fiber, said electrical property including electrical conductance per unit length of the carbon coating; and in response to the measured electrical property, changing at least one processing parameter for controlling the thickness of the carbon coating being deposited on the moving optical fiber, said parameter being at least one of
   (a) temperature of the moving optical fiber,
   (b) concentration of carbon-containing compound,
   (c) pressure of the carbon-containing compound,
   (d) duration of optical fiber exposure to the carbon-containing compound.

2. A process for making an optical fiber comprising a core and a cladding together with a coating consisting primarily of carbon for hermetically sealing the optical fiber, the prosess comprising the following steps:

heating at least an end portion of an optical fiber preform and drawing material from the heated portion of the optical fiber preform into an elongated moving optical fiber;

exposing the moving optical fiber to a gaseous carbon-containing compound under conditions such that the compound decomposes in response to the heat in the optical fiber and a coating consisting primarily of elemental carbon is deposited on the surface of the optical fiber in a thickness which is thick enough to effectively hermetically seal the optical fiber and, yet, thin enough to avoid vulnerability of the carbon coating to cracking which could lead to a reduction in the fiber strength;

measuring contactlessly an electrical property at least partially dependent upon thickness of the carbon coating deposited on the moving optical fiber, said electrical property including electrical conductance per unit length of the carbon coating; and in response to the measured electrical property, changing at least one processing parameter for controlling the thickness of the carbon coating being deposited on the moving optical fiber, said parameter being at least one of
   (a) temperature of the moving optical fiber,
   (b) concentration of carbon-containing compound,
   (c) pressure of the carbon-containing compound,
   (d) duration of optical fiber exposure to the carbon-containing compound.

3. A process for making an optical fiber, in accordance with claim 2, wherein
   temperature of the optical fiber exposed to the carbon containing compound is changed in response to the measured electrical property.

4. A process for making an optical fiber, in accordance with claim 2, wherein
   concentration of the carbon containing compound is changed in response to the measured electrical property.

5. A process for making an optical fiber, in accordance with claim 2, wherein
   pressure of the carbon containing compound is changed in response to the measured electrical property.

6. A process for making an optical fiber, in accordance with claim 2, wherein
   duration of fiber exposure to the carbon containing compound is changed in response to the measured electrical property.

7. A process for making an optical fiber in accordance with claim 2, in which
   said electrical property measuring step includes measuring an electrical characteristic of a radio frequency circuit being used for measuring the electrical conductance of the carbon coating; and
   said changing of said at least one processing parameter is conducted in response to the measured electrical characteristic.

8. A process for making an optical fiber, in accordance with claim 7, wherein
   said electrical charateristic is the quality factor Q of the radio frequency circuit.

9. A process for making an optical fiber, in accordance with claim 7, wherein
   said electrical characteristic is an output energy from the radio frequency circuit.

* * * * *